United States Patent
Ichikawa et al.

(10) Patent No.: US 10,864,705 B2
(45) Date of Patent: Dec. 15, 2020

(54) LIQUID CRYSTAL LAMINATE AND METHOD FOR MANUFACTURING A LIQUID CRYSTAL LAMINATE

(71) Applicant: TOPPAN PRINTING CO., LTD., Tokyo (JP)

(72) Inventors: Koji Ichikawa, Tokyo (JP); Hideki Ochiai, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 229 days.

(21) Appl. No.: 16/019,917

(22) Filed: Jun. 27, 2018

(65) Prior Publication Data

US 2018/0304586 A1 Oct. 25, 2018

Related U.S. Application Data

(63) Continuation of application No. PCT/JP2016/088920, filed on Dec. 27, 2016.

(30) Foreign Application Priority Data

Dec. 28, 2015 (JP) .................. 2015-256015

(51) Int. Cl.
| | |
|---|---|
| C08G 64/00 | (2006.01) |
| B32B 15/085 | (2006.01) |
| B42D 25/328 | (2014.01) |
| B42D 25/364 | (2014.01) |
| B32B 15/08 | (2006.01) |
| B42D 25/45 | (2014.01) |
| G02B 5/18 | (2006.01) |
| G03H 1/00 | (2006.01) |
| G03H 1/02 | (2006.01) |
| G03H 1/18 | (2006.01) |
| G02B 26/06 | (2006.01) |
| B32B 15/082 | (2006.01) |
| G03H 1/04 | (2006.01) |

(52) U.S. Cl.
CPC ............ *B32B 15/085* (2013.01); *B32B 15/08* (2013.01); *B32B 15/082* (2013.01); *B42D 25/328* (2014.10); *B42D 25/364* (2014.10); *B42D 25/45* (2014.10); *G02B 5/18* (2013.01);
*G02B 5/1814* (2013.01); *G02B 26/06* (2013.01); *G03H 1/0011* (2013.01); *G03H 1/0244* (2013.01); *G03H 1/0248* (2013.01); *G03H 1/0256* (2013.01); *G03H 1/182* (2013.01); *G03H 1/04* (2013.01); *G03H 2001/188* (2013.01); *G03H 2250/36* (2013.01); *G03H 2250/38* (2013.01); *G03H 2250/42* (2013.01)

(58) Field of Classification Search
USPC ........................................................ 428/458
See application file for complete search history.

(56) References Cited

U.S. PATENT DOCUMENTS

2008/0303975 A1* 12/2008 Mizuno .................. G02B 5/045
349/62

FOREIGN PATENT DOCUMENTS

| JP | 2000-309196 A | 11/2000 |
|---|---|---|
| JP | 2003-255115 A | 9/2003 |
| JP | 2004-142167 A | 5/2004 |
| JP | 2006-276090 A | 10/2006 |

OTHER PUBLICATIONS

International Search Report with English language translation and Written Opinion issued in International Application No. PCT/JP2016/088920 dated Apr. 4, 2017.

* cited by examiner

*Primary Examiner* — Terressa Boykin
(74) *Attorney, Agent, or Firm* — Foley & Lardner LLP (57) ABSTRACT

A liquid crystal laminate includes a substrate including a first diffraction surface and a second base material surface and having optical transparency, a metal layer located on a part of the first diffraction layer, an adhesion layer located on a part of the second base material layer and made of a photocured resin, and liquid crystal layer located on a surface of the adhesion layer at a side opposite to the contact surface of the substrate.

3 Claims, 6 Drawing Sheets

LIQUID CRYSTAL LAMINATE AND METHOD FOR MANUFACTURING A LIQUID CRYSTAL LAMINATE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2016/088920, filed on Dec. 27, 2016, which is based upon and claims the benefit of priority to Japan Priority Application No. 2015-256015, filed on Dec. 28, 2015, the disclosures of which are all hereby incorporated herein by reference in their entireties.

BACKGROUND

The present invention relates to a crystal laminate capable of being used for manufacture of displays and also to a method for the manufacturing a liquid crystal laminate.

For anti-counterfeiting purposes, securities and authentication mediums are attached with a display body that is harder to be counterfeited. As such a display body, there has been proposed one that includes a diffraction layer having a diffraction structure such as a hologram, and a metal layer located on a part of a concave-convex surface of the diffraction layer (e.g. see Patent Literature 1).

Additionally, there has been proposed, for example, a display body which includes a layer made of a compound which shows the state of cholesteric liquid crystals and is thus a liquid crystal layer whose appearance or color changes in relation to the observation angle of the display body, or in relation to the angle formed between a plane including the direction of the visual line of an observer and the surface of the display body. This display body is formed from a liquid crystal laminate including a base material, a liquid crystal layer and a thermal adhesion layer and is formed by transferring a part of the liquid crystal laminate including the liquid crystal layer to other substrate (e.g. see Patent Literature 2).

[Citation List] [Patent Literature] PTL 1: JP 2003-255115 A; PTL 2: JP 2004-142167 A

SUMMARY OF THE INVENTION

Technical Problem

By the way, in order to enhance the effect of the anti-counterfeiting of display body, there has been proposed a combination of the above-mentioned two display bodies.

In this case, in the manufacture of a laminate used for the formation of a display body including a diffraction layer and a liquid crystal layer, the liquid crystal layer is transferred to a base material of a diffraction laminate having a diffraction layer by use of an adhesion layer of a liquid crystal laminate, and heat is applied to the adhesion layer thereby curing the adhesion layer.

The transfer of the liquid crystal layer to the diffraction laminate is carried out according to a roll-to-roll method so as to increase the manufacturing productivity of the laminate. On the other hand, the curing of the adhesion layer usually needs to apply heat to the adhesion layer over several days, so that the adhesion layer is applied with heat in the state that the laminate including the diffraction layer and the liquid crystal layer are rolled up on a winding core.

When the pressure exerted toward the winding core along the radial direction of the winding core is imparted to the adhesion layer prior to curing, the liquid crystal layer sandwiched between the adhesion layer and the metal layer undergoes deformation along with the adhesion layer that has only such a hardness as to permit deformation followed by the shape of the metal layer.

It will be noted that such circumstances are for a diffraction layer-free laminate, but are common even to those laminates of the type wherein a liquid crystal layer and a metal layer that is facing a part of a base material are in face-to-face relation with each other through an adhesion layer.

The present invention has for an object the provision of a liquid crystal laminate capable of better suppressing the deformation of a liquid crystal layer and also of a method for manufacturing a liquid crystal laminate.

Solution to Problem

The liquid crystal laminate for trying to improve the above problems includes a substrate including a first surface and a second surface and having optical transparency, a metal layer located on a part of the first surface, an adhesion layer located on the second surface and formed from a photocurable resin, and a liquid crystal layer located on a surface of the adhesion layer at a side opposite to a contact surface with the substrate.

The method for manufacturing a liquid crystal laminate for trying to improve the above problems includes providing a substrate including a first surface and a second surface and having optical transparency, forming a metal layer on the first surface of the substrate, providing a liquid crystal layer, locating a precursor layer containing a photocurable resin between the second surface of the substrate and the liquid crystal layer in such a way as to contact with the substrate and the liquid crystal layer, and irradiating light to the precursor layer to cure the precursor layer thereby forming an adhesion layer.

According to the above configuration, the adhesion layer for adhesion between the substrate and the liquid crystal layer is formed from a photocurable resin, so that when compared with the case that the adhesion layer is formed from a thermosetting resin, the curing speed of the precursor layer used to form the adhesion layer becomes higher and the time required for the curing of the precursor layer becomes shorter. Therefore, the possibility of deforming the precursor layer by imposing an external force on the precursor layer prior to curing can be made low. As a result, the deformation of the liquid crystal layer in association with deformation of the precursor may be better suppressed.

DESCRIPTION OF THE REPRESENTATIVE EMBODIMENTS

With reference FIGS. 1 to 11, a representative embodiment embodying a liquid crystal laminate and a method for manufacturing a liquid crystal laminate will now be described. In the following, the configuration of a liquid crystal laminate, a method for manufacturing a liquid crystal laminate, the function of a liquid crystal laminate, materials used to form a liquid crystal laminate, and examples are successively described. It will be understood that the following description is intended to be representative of the present invention and that the scope of the present invention is not necessarily limited to the following representative embodiment.

[Configuration of Liquid Crystal Laminate]

The configuration of a liquid crystal laminate is illustrated with reference to FIGS. 1 to 3.

Figure 1:
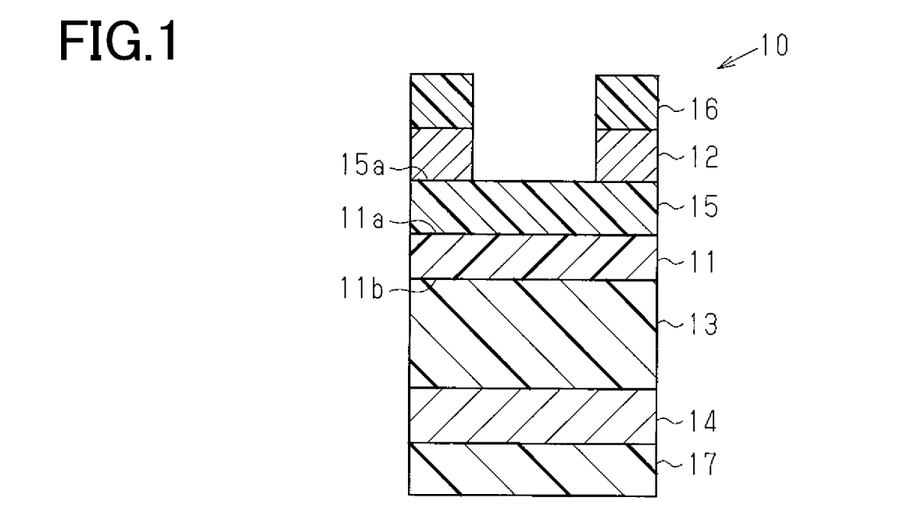
FIG. 1 is a partially sectional view showing a partially sectional structure of a liquid crystal laminate in one embodiment embodying a liquid crystal laminate of the present invention.

As shown in FIG. 1, a liquid crystal laminate 10 includes a base material 11, a metal layer 12, an adhesion layer 13, and a liquid crystal layer 14. The base material 11 includes a first base material surface 11a and a second base material surface 11b and has optical transparency. The metal layer 12 is facing a part of the first base material surface 11a of the base material 11, and the adhesion layer 13 is located on the second base material surface 11b of the base material 11. The liquid crystal layer 14 is located on a surface of the adhesion layer 13 at a side opposite to the contact surface with the base material 11.

With the liquid crystal laminate 10, the adhesion layer 13 for adhesion between the base material 11 and the liquid crystal layer 14 is formed from a photocurable resin. Accordingly, when compared with the case that the adhesion layer is formed from a thermosetting resin, the curing speed of a precursor layer used to form the adhesion layer 13 becomes higher with a shorter time required for the curing of the precursor layer. Therefore, when an external force is imposed on the precursor layer prior to curing, the possibility of deforming the precursor layer can be made low.

Eventually, the deformation of the liquid crystal layer 14 associated with the deformation of the precursor can be suppressed.

The liquid crystal layer 10 further includes a diffraction layer 15. The diffraction layer 15 is located between the base material 11 and the metal layer 12, and is in contact with the base material 11 and the metal layer 12, respectively. The diffraction layer 15 has a diffraction structure at at least a part of a first diffraction surface 15a which is a surface at a side opposite to the contact surface with the substrate 11. More particularly, the liquid crystal laminate 10 is provided with a substrate constituted of the base material 11 and the diffraction layer 15, and the substrate includes a first diffraction surface 15a indicated as an example of a first surface and a second base material surface 11b indicated as an example of a second surface and has optical transparency. The metal layer 12 is located on a part of the first base material surface 11a. According to such a liquid crystal laminate 10 as set out above, the deformation of the liquid crystal layer 14 can be suppressed even in the configuration including the diffraction layer 15.

The diffraction layer 15 is such that at least a part of the first diffraction surface 15a is in the form of a concave-convex surface included in the diffraction structure. If only a part of the first diffraction surface 15a is formed as a concave-convex surface, a portion superposed with the metal layer 12 should preferably be the concave-convex surface, in plan view perpendicular to the first substrate material surface 11a of the base material 11. In other words, it is preferred that the metal layer 12 is located on the concave-convex surface of the diffraction layer 15.

In plan view perpendicular to the first base material surface 11a, when the concave-convex surface and the metal layer 12 are superposed, light incident on the diffraction layer 15 is likely to be reflected at the concave-convex surface, so that the quantity of light emitted from the diffraction layer increases.

The diffraction structure of the diffraction layer 15 may be any of a relief hologram, a volume hologram and a diffraction lattice, or may be a combination of two or more thereof.

The liquid crystal laminate 10 may further include a mask layer 16, and the mask layer 16 is located on a surface of the metal layer 12 at a side opposite to a contact surface with the diffraction layer 15. The mask layer 16 is a mask used for forming the metal layer 12 by etching and has such a shape as to be substantially wholly superposed with the metal layer 12 in the thickness direction of the liquid crystal laminate 10.

Since the liquid crystal laminate 10 has the mask layer 16, the area of a portion of the metal layer 12 exposed to outside becomes smaller when compared with the case that no mask layer 16 is provided. Hence, when compared with the case that no mask layer 16 is provided, the metal layer 12 is suppressed from being chemically denatured or physically damaged.

The liquid crystal laminate 10 may further include a protective layer 17, and the protective layer 17 is located on a surface at a side opposite to the contact surface of the liquid crystal layer 14 with the adhesion layer 13. Since the liquid crystal laminate 10 is provided with the protective layer 17, the area of a portion of the liquid crystal layer 14 exposed to outside becomes smaller when compared with the case that no protective layer 17 is provided. Hence, when compared with the case that no protective layer 17 is provided, the liquid crystal layer 14 is suppressed from being chemically denatured or physically damaged.

Figure 2:
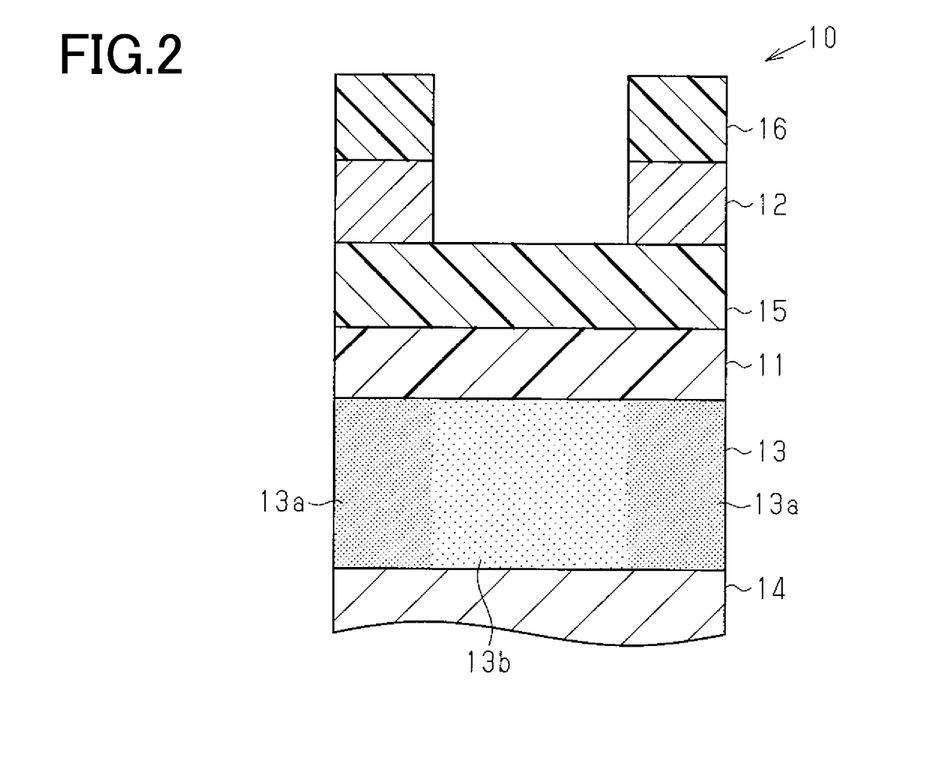
FIG. 2 is a partially enlarged sectional view showing a part of a liquid crystal laminate as enlarged in its sectional structure.

In FIG. 2, the cross-sectional structure of the liquid crystal laminate 10 is shown as partially enlarged. It will be noted that in FIG. 2, a difference in crosslink density of the adhesion layer 13 is expressed by a difference in dot density indicated on the adhesion layer 13 for the purpose of illustration.

As shown in FIG. 2, a portion of the adhesion layer 13 superposed with the metal layer 12 in the thickness direction of the adhesion layer 13 is a first portion 13a, and a portion not superposed with the metal layer 12 is a second portion 13b. More particularly, the adhesion layer 13 has the first portion 13a overlapped with the metal layer 12 in the thickness direction of the adhesion layer 13 and the second portion 13b not overlapped with the metal layer 12 in the thickness direction of the adhesion layer 13. The crosslink density of a photocured resin in the first portion 13a of the adhesion layer 13 may be higher than the crosslink density of a photocured resin in the second portion 13b.

The difference in crosslink density between the first portion 13a and the second portion 13b can be confirmed by measuring the infrared spectra of the first portion 13a and the infrared spectra of the second portion 13b by means of a Fourier transform infrared spectroscopic device and comparing the results of these measurements.

It is considered that if an absorption at a spectral peak corresponding to an unreacted functional group capable of being crosslinked in the respective portions is great, the crosslink density at the portions is low, whereas if the absorption at a spectral peak corresponding to an unreacted functional group capable of being crosslinked in the respective portions is small, the crosslink density at the portions is high. Therefore, the crosslink densities of the photocured resins can be compared using the absorptions at the spectral peaks corresponding to a crosslinkable, unreacted functional group.

It will be noted that the Fourier transform infrared spectroscopic device used can be Nicolet iS50 FT-IR, manufactured by Hitachi Hit-Tech Science Corporation.

The photocured resin for the adhesion layer 13 is such that a higher crosslink density of the photocured resin results in a higher hardness of the resulting adhesion layer 13, whereas a lower crosslink density of the photocured resin leads to better adhesion between the adhesion layer 13 and other layers contacting with the adhesion layer 13.

Accordingly, if the adhesion layer 13 has the first portion 13a and the second portion 13b that differ from each other with respect to the crosslink density, the hardness of the adhesion layer 13a is increased due to the first portion 13a and the adhesion between the adhesion layer 13 and the base material 11 and also between the adhesion layer 13 and the liquid crystal layer 14 are, respectively, increased due to the second portion 13b.

Figure 3:
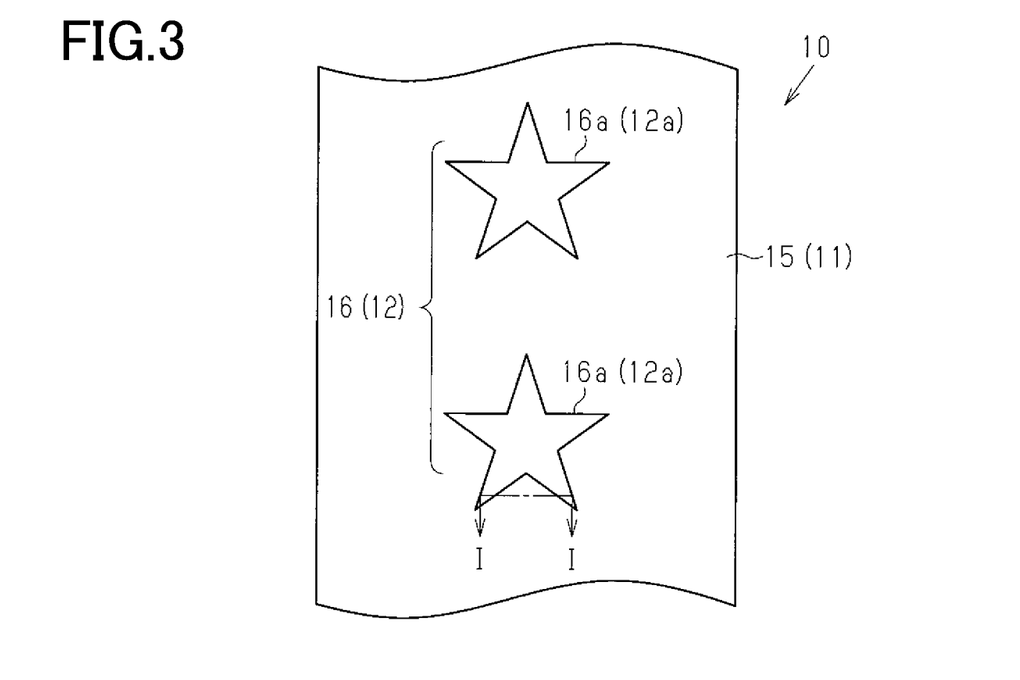
FIG. 3 is a plan view showing a plane structure in face-to-face relation with a first base material surface of a base material.

FIG. 3 shows a planar structure of the liquid crystal laminate 10 as viewed perpendicularly to the mask layer 16. It will be noted that FIG. 1 previously illustrated shows a sectional structure taken along the line I-I of FIG. 3.

As shown in FIG. 3, in plan view perpendicular to the mask layer 16, the laminate of the mask layer 16 and the metal layer 12 is located on a portion of the surface of the diffraction layer 15 at a side opposite to the contact surface with the base material 11. The metal layer 12 is constituted of a plurality of metal portions 12a and the mask layer 16 is also constituted of a plurality of mask portions 16a, which are the same in number as the metal portions 12a. More particularly, the metal layer 12 is patterned in a given shape and the mask layer 16 is also patterned substantially in the same shape in plan view perpendicular to the mask layer 16.

In plan view perpendicular to the mask layer 16, the individual metal portions 12a and the individual mask portions 16a have, for example, a star shape and may be shaped in other forms such as a line, a circle and a polygon. Alternatively, the individual metal portions 12a and the individual mask portions 16a may be shaped in a form of a letter or a symbol. The plurality of metal portions 12a and the plurality of mask portions 16a may not have the same shape, but may be shaped in mutually different forms.

[Method for Manufacturing a Liquid Crystal Laminate]

With reference to FIGS. 4 to 9, a method for manufacturing a liquid crystal laminate 10 is now described.

Figure 4:
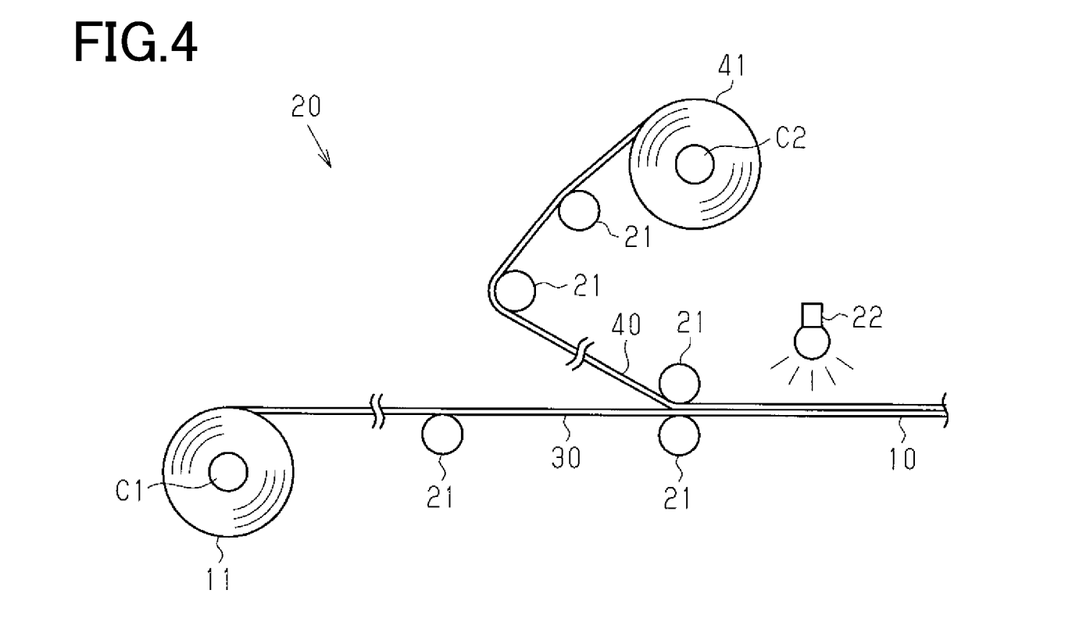
FIG. 4 is a schematic view schematically showing an outline configuration of a manufacturing apparatus of a liquid crystal laminate.

It will be noted that as shown in FIG. 4, a liquid crystal laminate 10 is manufactured using a liquid crystal laminate manufacturing apparatus 20, which is a roll-to-roll apparatus. The liquid crystal laminate manufacturing apparatus 20 includes a plurality of rolls 21 and an irradiation unit 22. The liquid crystal laminate manufacturing apparatus 20 forms a first laminate 30 including a base material 11 during the course of transfer of the base material 11 with the rolls 21, which is an instance of a first base material wound on a first winding core C1. Moreover, the liquid crystal laminate manufacturing apparatus 20 forms a second laminate 40 including a second base material 41 during the transfer, with the rolls 21, of a second base material 41 wound on a second winding core C2.

The liquid crystal laminate manufacturing apparatus 20 laminates the first laminate 30 and the second laminate 40 and irradiates light from the irradiation unit 22 to the laminate wherein the first laminate 30 and the second laminate 40 have been laminated thereby providing the liquid crystal laminate 10.

The method for manufacturing the liquid crystal laminate 10 includes forming a metal layer 12 which has a first base material surface 11a and a second base material surface 11b and is in face-to-face relation with a part of the first base material surface 11a of the base material 11 having optical transparency, and locating, between the base material 11 and the liquid crystal layer 14, a precursor layer that contains a photocurable resin and is in contact with the base material 11 and the liquid crystal layer 14. The method for manufacturing the liquid crystal laminate 10 further includes curing the precursor layer by light irradiation to the precursor layer to form an adhesion layer 13.

More particularly, the method for manufacturing the liquid crystal laminate 10 includes providing a substrate including a first diffraction surface 15a and the second base material surface 11b and having optical transparency, and forming the metal layer 12 on a part of the first diffraction surface 15a of the substrate. The method for manufacturing the liquid crystal laminate 10 also includes providing the liquid crystal layer 14, and locating a precursor layer containing a photocurable resin between the second base material surface 11b of the substrate and the liquid crystal layer 14 in such a way that the precursor is in contact with the substrate and the liquid crystal layer 14. Further, the method for manufacturing the liquid crystal laminate 10 includes irradiating light to the precursor layer to cure the precursor layer thereby forming the adhesion layer 13.

Figure 5:
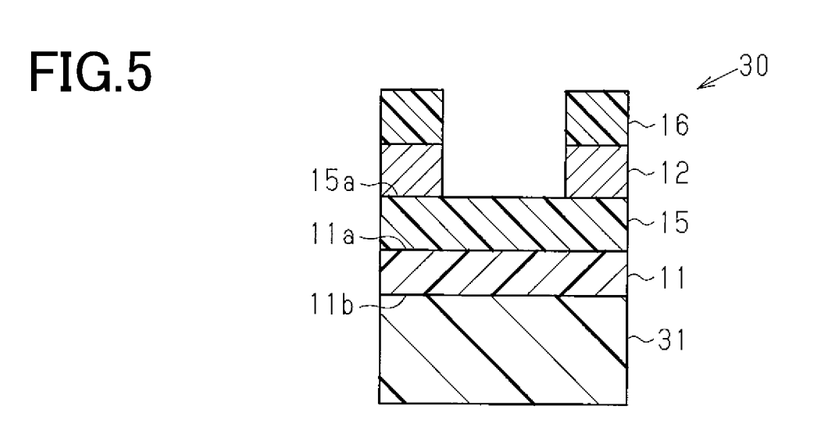
FIG. 5 is a view of process showing the step of forming a first laminate in a manufacturing method of a liquid crystal laminate.

That is, as shown in FIG. 5, in the manufacturing method of the liquid crystal laminate 10, a first laminate 30 for forming the liquid crystal laminate 10 is formed, and the formation of the first laminate 30 initially includes forming the diffraction layer 15 on the first base material 11a of the base material 11. The diffraction layer 15 is formed, for example, through the step of forming a coated film by coating a coating solution containing different types of resins serving as a forming material for the diffraction layer 15 onto the first base material surface 11a of the base material 11, and the step of curing the coated film while pressing a stamper used to form a diffraction structure on a surface of the coated film at a side opposite to a contact surface with the base material 11.

Next, a metal film is formed to form the metal layer 12 entirely on the first diffraction surface 15a of the diffraction layer 15, and a resist material layer is formed to form a mask layer 16 on a surface of the metal film at a side opposite to the diffraction layer 15. Thereafter, the resist material layer is subjected to patterning to form a mask layer 16, followed by etching the metal layer by use of the mask layer 16 to form the metal layer 12 in face-to-face relation with a part of the first base material surface 11a of the base material 11.

A precursor layer 31 for forming the above-mentioned adhesion layer 13 is formed on the second base material surface 11b of the base material 11. The precursor layer 31 is formed by coating a coating solution containing a photocurable resin and a liquid organic compound for dispersing or dissolving the photocurable resin onto the second base material surface 11b of the base material 11. In this way, the first laminate 30 is obtained.

Figure 6:
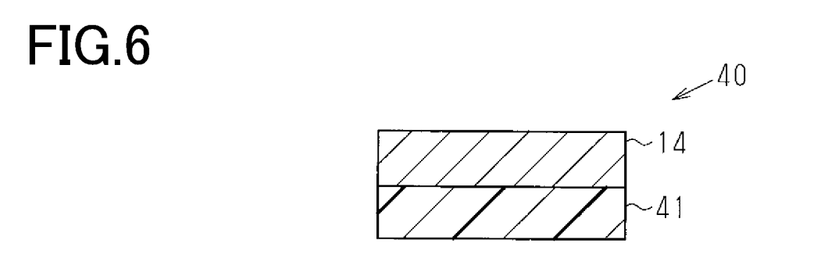
FIG. 6 is a view of process showing the step of forming a second laminate in the manufacturing method of a liquid crystal laminate.

On the other hand, as shown in FIG. 6, a second laminate 40 is formed for the formation of the liquid crystal laminate 10. When the second laminate 40 is formed, a liquid crystal layer 14 is formed on one surface of a second base material 41. The liquid crystal layer 14 is formed, for example, through the steps of forming a coated film by coating a coating solution containing a liquid crystal material onto the second base material 41, drying the coated film, and curing the liquid crystal material. It will be noted that the liquid crystal material used to form the liquid crystal layer 14 includes, for example, a photocurable liquid crystal monomer having an acrylate at opposite ends of a mesogenic group, a polymer liquid crystal capable of being cured with an electron beam or ultraviolet light, a polymer liquid crystal having a mesogenic group in the main chain of the polymer, and a liquid crystal polymer whose main chain of the molecule can be self-oriented. These liquid crystals can be promoted in orientation by forming a coated film by coating a coating solution and subjecting the coated film to thermal treatment at a temperature slightly lower than the NI point at which phase transition occurs.

Figure 7:
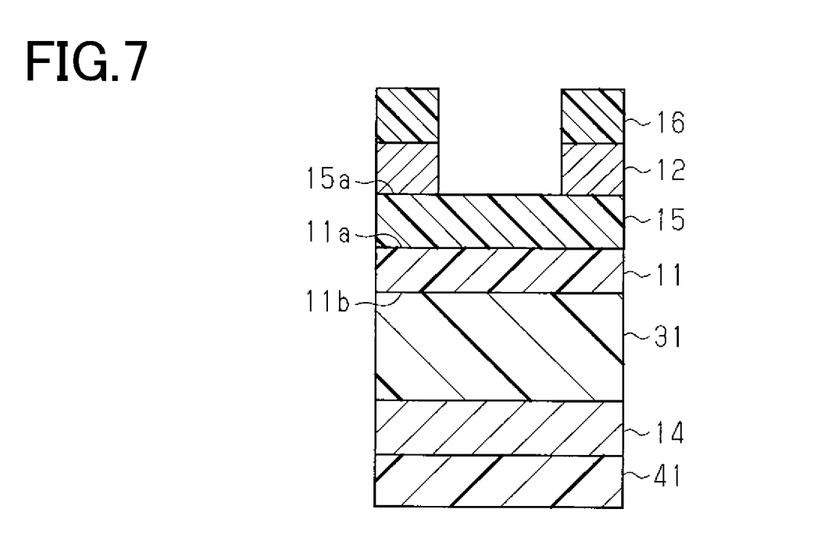
FIG. 7 is a view of process showing the step of laminating the first laminate and the second laminate in the manufacturing method of a liquid crystal laminate.

As shown in FIG. 7, the first laminate 30 and the second laminate 40 are laminated in the state that the precursor layer 31 of the first laminate 30 and the liquid crystal layer 14 of the second laminate 40 are facing each other. In this manner, the precursor layer 31 containing a photocurable resin and contacting with the base material 11 and the liquid crystal layer 14 are located between the base material 11 and the liquid crystal layer 14.

Figure 8:
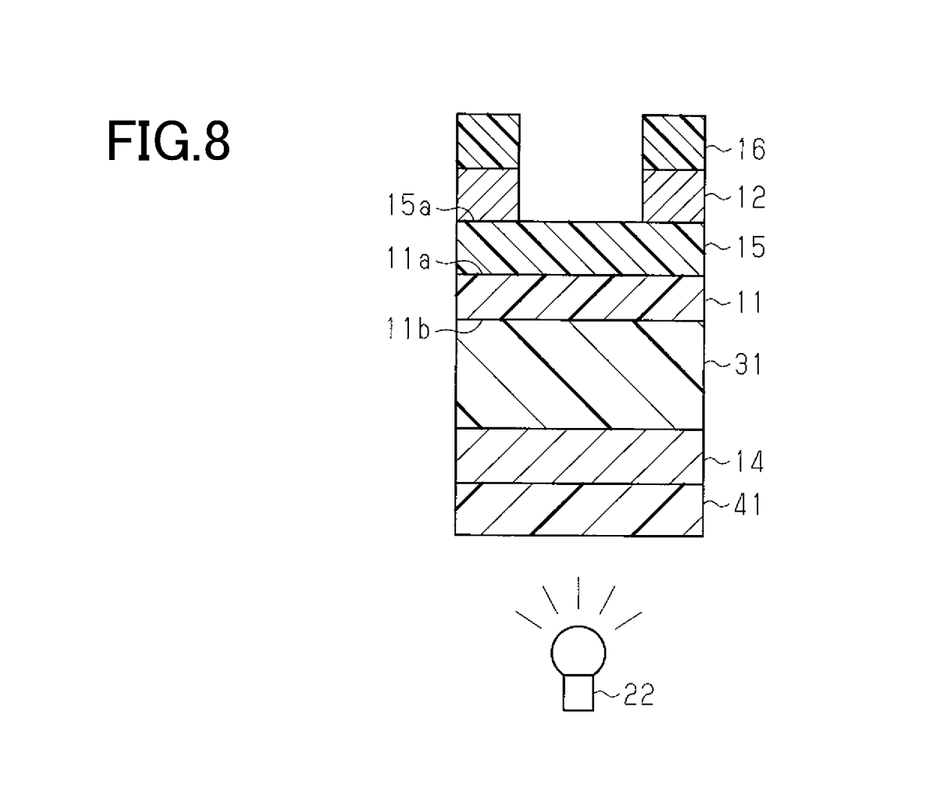
FIG. 8 is a view of process showing the step of irradiating light to a precursor layer in the manufacturing method of a liquid crystal laminate.

As shown in FIG. 8, light is irradiated to the precursor layer 31 to cure the precursor layer 31 thereby forming the adhesion layer 13. At this stage, an irradiation unit 22 is located at a side of the precursor layer 31 opposite to the metal layer 12, so that light is irradiated toward the precursor layer 31 at the side of the precursor layer 31 opposite to the metal layer 12. Light irradiation to the precursor layer 31 is continued, for example, over several seconds to several minutes.

In plan view perpendicular to the first base material surface 11a of the base material 11, this enables a greater light quantity to be irradiated at portions of the adhesion layer 13 superposed with the metal layer than at other portions by the quantity of irradiated light reflected with the metal layer 12. Accordingly, the crosslink density at the portions of the adhesion layer 13 superposed with the metal layer 12 can be increased over the crosslink density at the other portions of the adhesion layer 13. Therefore, the hardness of the adhesion layer 13 can be enhanced depending on the portions at which the crosslink density is relatively high, and the adhesion between the adhesion layer 13 and the base material 11 and the adhesion between the adhesion layer 13 and the liquid crystal layer 14 can be increased depending on the portions at which the crosslink density is relatively low.

It will be noted that the irradiation unit 22 can be selected from UV irradiation lamps and visible light irradiation lamps depending on the light wavelength capable of curing a photocurable resin.

Figure 9:
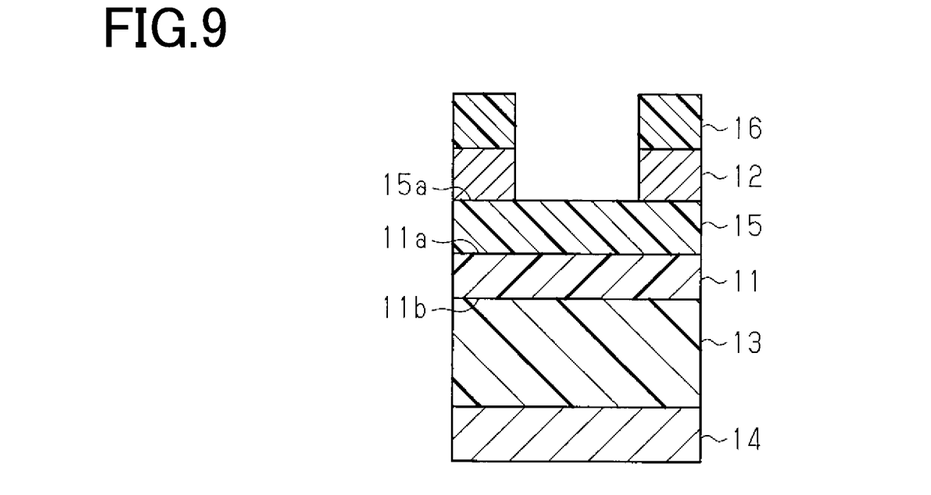
FIG. 9 is a view of process showing the step of releasing a second base material in the manufacturing method of a liquid crystal laminate.

As shown in FIG. 9, the liquid crystal layer 14 is transferred to the base material 11 by peeling the second substrate material 41 from the liquid crystal layer 14. A protective layer 17 is subsequently formed on a surface at a side of the liquid crystal layer 14 opposite to its contact surface with the adhesion layer 13. The protective layer 17 is formed, for example, through the steps of coating a coating solution used for the protection layer 17 onto the liquid crystal layer 14 and curing the coated film. In this way, the liquid crystal laminate 10 having such a configuration as previously illustrated with reference of FIG. 1 can be obtained.

[Function of Liquid Crystal Laminate]

Figure 10:
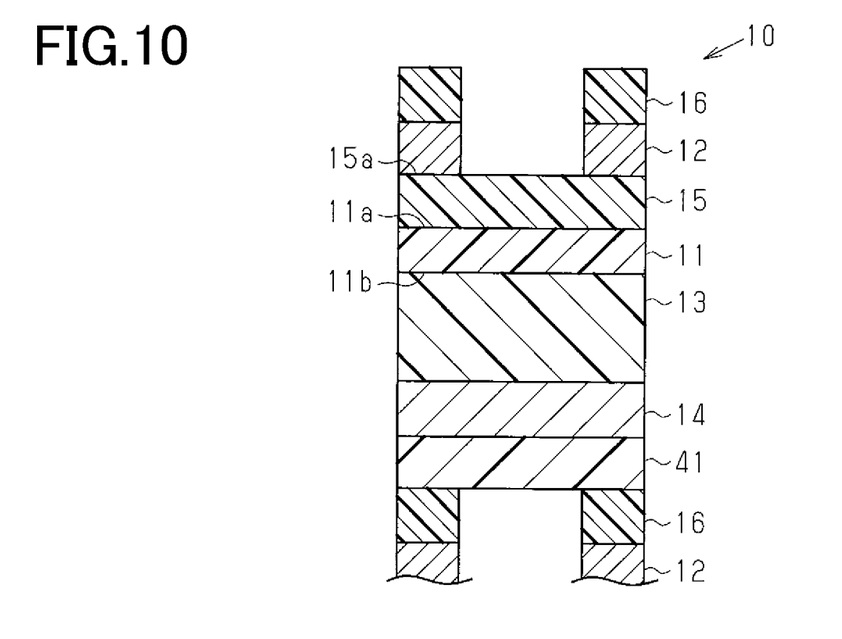
FIG. 10 is a view for illustrating how a liquid crystal laminate works.
Figure 11:
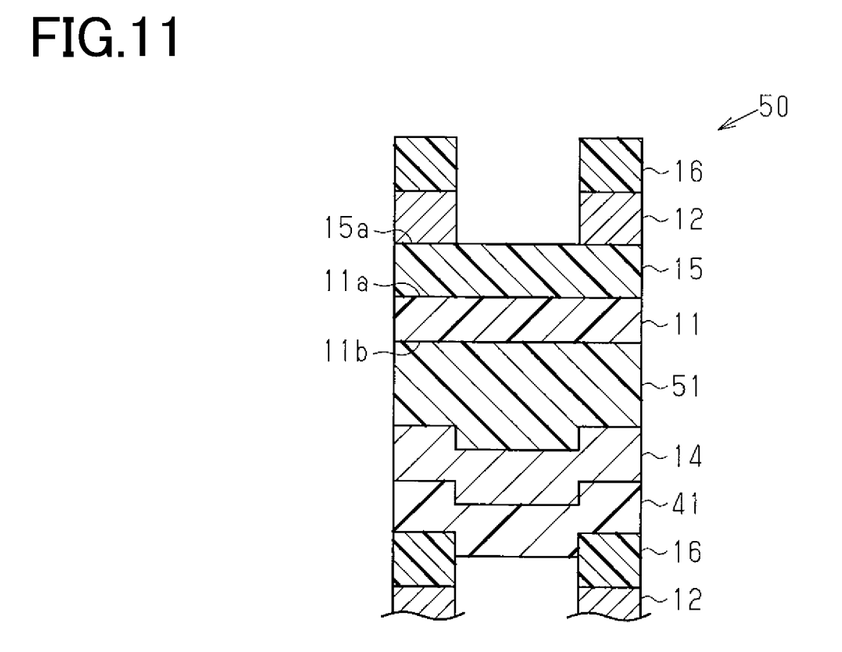
FIG. 11 is a view for illustrating how a liquid crystal laminate works.

With reference to FIGS. 10 and 11, the function of the liquid crystal laminate 10 is described.

Such a liquid crystal laminate 10 as stated above has the adhesion layer 13 made from a photocurable resin as an adhesion layer for adhesion of the liquid crystal layer 14 on the first laminate 30. Accordingly, when the precursor layer 31 prior to curing is irradiated with light over several seconds to several minutes, the cured adhesion layer 13 can be formed.

In the manufacturing process of the liquid crystal laminate 10, a laminate of the first laminate 30 and the second laminate 40 may be, in some cases, wound on a winding core immediately after the light irradiation against the precursor layer 31. In this case, the laminate of the first laminate 30 and the second laminate 40 is wound on the winding core in such a state as to be applied, for example, with a pressure of several MPa.

This permits, as shown in FIG. 10, a part of the second base material 41 to be contacted with the mask layer 16, so that the laminate of the mask layer 16 and the metal layer 12 is pressed against only the part of the second base material 41. As state above, the precursor layer 31 has been substantially cured at the time when light irradiation against the precursor layer 31 is performed. Accordingly, even if the laminate of the mask layer 16 and the metal layer 12 is pressed against only the part of the second base material 41, there can be suppressed occurrence of a press mark, which might be formed by pressing the mask layer 16 and the metal layer 12 against the adhesion layer 13, and eventually against the liquid crystal layer 14 and the second base material 41.

In contrast, with a configuration that has a liquid crystal laminate having an adhesion layer made from a thermosetting resin as an adhesion layer for adhesion of a liquid crystal layer 14 to a first laminate 30, the curing of a precursor layer usually needs to continue heating of the precursor layer over several days. Accordingly, the laminate of the first laminate 30 and the second laminate 40 is heated while being wound on a winding core.

This permits the laminate of the first laminate 30 and second laminate 40 to be heated in the state of a part of the second base material 41 being in contact with the mask layer 16. Only a part of the precursor layer prior to curing, which is superposed with a contact portion with the mask layer 16 of the second base material 41 in the thickness direction of the laminate, is applied with pressure from the mask layer 16 and the metal layer 12.

Although the precursor layer prior to curing has such a low hardness as to allow deformation thereof due to the pressure applied from the mask layer 16 and the metal layer 12, the base material 11, the diffraction layer 15, the metal layer 12 and the mask layer 16, respectively, have hardnesses higher than the precursor layer. Therefore, the press marks with the mask layer 16 and the metal layer 12 are produced at a portion of the precursor layer pressed toward the base material 11 by the mask layer 16 and the metal layer 12 during the time before the precursor layer has been cured.

As a result, as shown in FIG. 11, with a liquid crystal laminate 50 having an adhesion layer 51 made from a thermosetting resin, the adhesion layer 51 undergoes deformation, and the liquid crystal layer 14 and a second base material 41, both superposed with the adhesion layer 51, are also deformed by following the deformation of the adhesion layer 51.

[Forming Materials of Liquid Crystal Laminate]

The forming materials for the respective layers used to form the liquid crystal laminate 10 are now described.

[Base Material]

The base material 11 should have heat resistance and mechanical strength sufficient not to be deformed by softening when thermal pressure is applied to the base material 11 upon the formation of the diffraction layer 15. The base material 11 may be either a non-stretched film manufactured by extrusion or casting, or a stretched film manufactured by stretching. The base material 11 may be a stretched film including a monoaxially stretched film or a biaxially stretched film.

Alternatively, the base material 11 may be, for example, cellophane. The forming materials for the base material 11 can include polycarbonate (PC), polyethylene (PE), polypropylene (PP), polyolefins (PO), ethylene vinyl alcohol (EVOH), polyvinyl alcohol (PVA), polyvinyl chloride (PVC), polyethylene naphthalate (PEN), polyethylene terephthalate (PET), nylons, acrylic resins, triacetyl cellulose (TAC), polymethyl methacrylate, and polystyrene.

It will be noted that the forming materials for the base material 11 are not limited to such synthetic resins as mentioned above, but may include natural resins, paper and synthetic paper so far as they have optical transparency. Moreover, the base material 11 may have a single-layer structure constituted of one layer formed of any one of natural resins, paper and synthetic paper, or may be a lamination structure constituted of two or more layers.

The thickness of the base material 11 preferably ranges from 12 μm to 100 μm in view of enhancing working properties and processability of the base material 11.

[Diffraction Layer]

The forming materials for the diffraction layer 15 can include those materials capable of being stamped, and may be any of thermoplastic resins, thermosetting resins, UV curable resins, and electron beam curable resins. The thermoplastic resins include, for example, acrylic resins, cellulose resins and vinyl resins. The thermosetting resins include urethane resins wherein acrylic polyols or polyester polyols having a reactive hydroxyl group are added thereto with or crosslinked with polyisocyanates serving as a crosslinking agent, melamine resins, and phenolic resins. The UV-curable resins and electron beam curable resins include epoxy (meth)acryl resins and urethane (meth)acryl resins.

It is to be noted that the forming material for the diffraction layer 15 may be any one the materials mentioned above, or a combination of two or more thereof. Moreover, the forming materials for the diffraction layer 15 may not be limited to the materials mentioned above, but may be those materials capable of providing diffraction structures such as of a relief hologram, a volume hologram and a diffraction grating, i.e. concave-convex structures for forming a diffraction image.

[Metal Layer]

The forming materials used for the metal layer 12 can be metals having a high light reflection efficiency. As the forming materials for the metal layer 12, there can be used, for example, aluminum (Al), tin (Sn), chromium (Cr), nickel (Ni), copper (Cu) and gold (Au). The metal layer 12 may have a single-layer structure, or may have a laminate structure constituted of a plurality of layers that differ from one another in types of forming materials.

Of the above-mentioned forming materials aluminum is preferred from the standpoint that it is more inexpensive than other metals and makes no need of using a strong acid or a mixed acid as an etchant. As an etchant for aluminum, there can be used sodium hydroxide whose concentration is lowered by dilution.

The metal film used for forming the metal layer 12 can be formed, for example, by a vacuum deposition method, a sputtering method or the like. The thickness of the metal film, i.e. the thickness of the metal layer 12, is preferably from 50 Å to 10,000 Å, more preferably from 100 Å to 1,000 Å in light of the fact that there can be enhanced the resistance of the metal layer 12 against moisture infiltrated into the metal layer 12 from outside air and also against a corrosive substance diffused into the metal layer 12 from the diffraction layer 15.

[Mask Layer]

The forming materials for the mask layer 16 can be those materials which have a resistance against an etchant for the metal film and have adhesion to the metal film. When aluminum is, for example, a forming material for the metal film, the forming material for the mask layer 16 can be, for example, a vinyl chloride-vinyl acetate copolymer, a urethane resin, a polyolefin resin, a polyethylene imine resin, an acrylic resin, a silicone resin or the like. It will be noted that the mask layer 16 may have a single-layer structure, or may have a laminate structure constituted of a plurality of layers which differ from one another with respect to the types of forming materials for the respective layers.

[Adhesion Layer]

The forming materials used to form the adhesion layer 13 can be photocurable resins, and may also be UV-curable reins and visible light curable resins.

The forming material for the adhesion layer 13 may contain a first photocurable resin and a second photocurable resin. In this case, it is preferred that after curing, the first photocurable resin has a first crosslink density and the second photocurable resin has a second crosslink density lower than the first crosslink density.

If the forming material for the adhesion layer 13 contains both the first and second photocurable resins whose crosslink densities after curing differ from each other, the portions of the adhesion layer 13 formed from the first photocurable resin are increased in hardness of the adhesion layer 13. On the other hand, the portions of the adhesion layer 13 formed from the second photocurable resin contributes to increasing the adhesion between the adhesion layer 13 and the base material 11 and also between the adhesion layer 13 and the liquid crystal layer 14.

Where the forming materials for the adhesion layer 13 contains a first photocurable resin and a second photocurable resin, the adhesion layer 13 is so arranged as to have first portions made from the first photocurable resin and second portions made from the second photocurable resin. More particularly, the adhesion layer 13 includes a plurality of the first portions and a plurality of the second portions, and it is preferred that the plurality of the first portions and the plurality of the second portions are dispersed in the adhesion layer 13.

Such photocurable resins as mentioned above are used as dispersed or dissolved in a liquid organic compound when the precursor 31 is formed. The liquid organic compound preferably includes any one selected from the group consisting of toluene, methyl isobutyl ketone and isopropyl alcohol.

With cholesteric liquid crystals, when the molecules of a compound serving as cholesteric liquid crystals, i.e. a liquid crystal material, are changed with respect to their juxtaposing pitch, the color of the light reflected in the liquid crystal layer 14 is changed. When the precursor layer 31 is located between the base material 11 and the liquid crystal layer 14, some organic compound may be sometimes diffused into the liquid crystal layer 14 thereby changing the juxtaposing pitches of the molecules in the liquid crystal layer 14 although depending on the type of organic compound contained in the precursor layer 31. In this way, the liquid crystal layer 14 might reflect light having a color different from light having a desired color.

In this respect, when the organic compound used to disperse or dissolve a photocurable resin is any one of toluene, methyl isobutyl ketone and isopropyl alcohol, the pitch change of the molecules in the liquid crystal layer 14 can be suppressed, so that the change in the color of the light reflected in the liquid crystal layer 14 can be suppressed.

On the other hand, light is irradiated to the precursor layer 31 through the second base material 41. Accordingly, a photocurable resin forming the precursor layer 31 should be selected from ones that are cured by light having a wavelength different from light having a wavelength absorbed in the second base material 41. The irradiation unit 22 used should be one that enables radiation of light having a wavelength which is other than light wavelength absorbed in the second base material 41 and is capable of curing photocurable resins.

For instance, if the forming material for the second base material 41 is PET that allows permeation of UV light, a usable photocurable resin includes a UV-curable resin. Were the forming material for the second base material 41 is PET that allows permeation of UV light, a usable photocurable resin includes a UV-curable resin. Where PET capable of absorbing UV light is used as a forming material for the second base material 41, a visible light-curable resin can be used as a photocurable resin. In these cases, the irradiation unit 22 can be a high pressure mercury lamp.

For example, where PEN that is able to absorb light having a wavelength of 365 nm is provided as a forming material for the second base material 41, a photocurable resin used should be one that is cured by application of light having a wavelength greater than 356 nm and the irradiation unit 22 is so arranged as to radiate light having a wavelength greater than 365 nm.

In order to suppress the deformation of the adhesion layer 13 when the liquid crystal laminate 10 is wound on a winding core, a higher hardness of the adhesion layer 13 is more preferred. In this sense, it is preferred that the adhesion layer 13 has high adhesion enough to enable development of adhesion between the base material 11 and the liquid crystal layer 14 even if the hardness of the adhesion layer 13 is high. Therefore, the glass transition temperature is preferably not less than 50° C., more preferably not less than 80° C.

[Second Base Material]

The second base material 41 is preferably one, which is flexible and has optical transparency, i.e. a transparent base material. The second base material 41 may be made of a stretched film manufactured by stretching. The stretched film for the second base material 41 may be a monoaxially stretched film or a biaxially stretched film.

The stretched film may be, for example, cellophane. The forming materials for the stretched film can include, for example, PC, PE, PP, PO, EVOH, PVA, PVC, PEN, PET, nylons, acrylic resins, and TAC. It is preferred that the forming material for the stretched film is PET, from the standpoints of the strength and the ease in handling of stretched film, and the optical transparency used for curing the adhesion layer 13.

[Liquid Crystal Layer]

The forming material for the liquid crystal layer 14 may be a liquid-crystalline compound showing the state of cholesteric liquid crystals, or a liquid-crystalline compound showing a cholesteric phase, or a liquid-crystalline compound showing a chiral nematic phase wherein a chiral compound is added to a compound showing nematic liquid crystallinity.

Usable liquid-crystalline compounds include, for example, those compounds represented by the following structural formulas 1 to 5.

[Chemical Formula 1]

(1)

[Chemical Formula 2]

(2)

[Chemical Formula 3]

(3)

[Chemical Formula 4]

(4)

[Chemical Formula 5]

(5)

It will be noted that in the structural formula 1, m and n are, respectively, an integer within a range of 5 to 12, in the structural formula 2, m and n are, respectively, an integer within a range of 3 to 10, and in the structural formula 3, m is an integer within a range of 6 to 20. In the structural formula 4, l, m and n are, respectively, an integer of from 3 to 10, and in the structural formula 5, m and n are, respectively, an integer within a range of 5 to 12.

Ch in the formulas 1 to 5 represents a structure represented by the following structural formula 6.

[Chemical Formula 6]

(6)

The forming material for the liquid crystal layer 14 can include one of the compounds represented by the structural formulas 1 to 5, or two or more thereof. Where two or more of the compounds are used by mixing, a period of time, over which the cholesteric liquid crystallinity is kept when the liquid crystal layer 14 is heated, is changed depending on the types of compounds to be mixed and the ratios of the respective compounds in the mixture. Accordingly, where a mixture is used as the forming material for the liquid crystal layer 14, it is necessary to set the types of compounds to be mixed and the ratios of the respective compounds in the mixture so that a period of time capable of keeping cholesteric liquid crystallinity becomes a desired one.

The compounds of the structural formulas 1 to 5 may be used as a forming material for the liquid crystal layer 14 in the state dispersed in a transparent resin binder. The resin binder includes, for example, a polycarbonate, PMMA, polyvinyl alcohol, a polyamide or the like.

[Protective Layer]

The protective layer 17 is one that has optical transparency and serves to protect the liquid crystal layer 14 from UV light or abrasion. A variety of resins can be used as a forming material for the protective layer 17 depending on the function of development in the protective layer 17. The protective layer 17 may have a single-layer structure or a laminate structure constituted of a plurality of layers made of different types of forming materials. Even where the protective layer 17 has any of the single-layer structure and the laminate structure, the protective layer 17 may have a layer capable of receiving an ink, a pigment or the like as a layer including a surface at a side opposite to a contact surface with the liquid crystal layer 14.

EXAMPLES

Example 1

A biaxially PET film was provided as a second base material, and a cholesteric liquid crystal composition was coated onto one surface of the second base material in a dry thickness of 2 μm by use of a wire bar, followed by drying the cholesteric liquid crystal composition to form a liquid crystal layer. It will be noted that the cholesteric liquid crystal composition used was one that was made of the compound represented by the structural formula 1 and a methyl ketone solution and had a solid content of 30 mass % in the composition. In this way, there was obtained a second laminate.

A laminate constituted of a base material, a diffraction layer, a metal layer and a mask layer was provided, and a photocurable adhesive (Unidic V-9511, manufactured by Dic Corporation) (Unidic is a registered trade name) was coated onto a surface at a side opposite to the surface of the diffraction layer. The thus coated photocurable resin was heated at 100° C. for 30 seconds. In this manner, the photocurable adhesive was dried to form a precursor layer, thereby obtaining a first laminate.

Next, the precursor layer of the first laminate and the liquid crystal layer of the second laminate were set to face each other and laminated in such a way that the linear pressure of a laminator was set at 50 N/cm. The resulting laminate constituted of the first and second laminates was irradiated with UV light from a side of the precursor layer opposite to the base material. In this connection, a UV irradiation device was set at a UV power of 500 mJ/cm2 and the precursor layer was exposed to the light over about 1 minute. Eventually, an adhesion layer was formed.

After the formation of the adhesion layer, the second base material was peeled off from the liquid crystal layer to transfer the liquid crystal layer to the base material. A protective layer was coated onto the surface of the liquid crystal layer at a side opposite to the contact surface with the adhesion layer to obtain a liquid crystal laminate of Example 1 having a UV resistance.

Comparative Example 1

A biaxially stretched PET film was provided as a second substrate, and a cholesteric liquid crystal composition was coated onto one surface of the second base material in a dry thickness of 2 μm by use of a wire bar, followed by drying the cholesteric liquid crystal composition to form a liquid crystal layer. It will be noted that the cholesteric liquid crystal composition used was one that was made of the compound represented by the structural formula 1 and a methyl ketone solution and had a solid content of 30 mass % in the composition. In this way, a second laminate was obtained.

A laminate constituted of a base material, a diffraction layer, a metal layer and a mask layer was provided, and an adhesive was coated onto a surface at a side opposite to the surface of the diffraction layer in a dry thickness of 2 μm by use of a wire bar. It will be noted that the adhesive used was made of a thermosetting adhesive (Coronate L, manufactured by Tosoh Corporation) (Coronate is a registered trade name) and HDI (hexamethylene diisocyanate) with a ratio of NCO/OH in the thermosetting adhesive and HDI being at 1.5. The thus coated adhesive was heated at 100° C. over 30 seconds. In this way, the adhesive was dried to form a precursor layer thereby obtaining a first laminate.

Next, the precursor layer of the first laminate and the liquid crystal layer of the second laminate were set to face each other and laminated in such a way that the linear pressure of a laminator was set at 50 N/cm. The resulting laminate constituted of the first and second laminates was aged at 60° C. over 3 days.

After the formation of the adhesion layer by curing the precursor layer by aging, the second base material was peeled off from the liquid crystal layer to transfer the liquid crystal layer to the base material. A protective layer was coated onto the surface of the liquid crystal layer at a side opposite to the contact surface with the adhesion layer to obtain a liquid crystal laminate of Comparative Example 1 having a UV resistance.

[Evaluation Method and the Results of the Evaluation]

A plurality of laminates, which had been obtained after completion of the lamination step of the first and second laminates in the manufacturing process of the liquid crystal laminate in Example 1, were provided thereby providing the respective laminates as laminates of Test Example 1. Likewise, a plurality of laminates, which had been obtained after completion of the lamination step of the first and second laminates in the manufacturing process of the liquid crystal laminate in Comparative Example 1, were provided thereby providing the respective laminates as laminates in Test Example 2.

While the plurality of laminates of Test Examples 1 were applied with a pressure of 5 MPa in their superposed state, UV light was irradiated against the plurality of laminates over about 1 minute, followed by continuing the application of the pressure on the plurality of laminates of Test Example 1 over one day. On the other hand, the plurality of laminates of Test Example 2 were allowed to stand in an atmosphere of 60° C. over one day while applying a pressure of 5 MPa on the plurality of laminates of Test Example 2 in a superposed state thereof With the respective laminates of Test Example 1, it was recognized that the contact portion of the base material with the mask layer of other sheets and the superposed portions of the crystal layer and the adhesion layer with the mask layer of other laminates in the thickness direction of the laminate underwent substantially no deformation.

On the other hand, with the respective laminates of Test Example 2, it was recognized that the press mark made with the mask layer was formed at a contact portion of the base material with the mask layer of other laminate. With some laminates provided with the base materials having a press mark made with the mask layer among the laminates of Test Example 2, it was recognized that a press mark made with the mask layer was formed at a portion of the liquid crystal layer and the adhesion layer superposed with the press mark of the base material in the thickness direction of the laminate. Thus, according to the laminates of Test Example 1, it was recognized that the deformation of the liquid crystal layer associated with the deformation of the adhesion layer could be suppressed.

As stated hereinabove, according to an embodiment of the liquid crystal laminate and the method for manufacturing a liquid crystal laminate, the following effects can be obtained.

(1) Since the adhesion layer 13 for adhesion between the base material 11 and the liquid crystal layer 14 is formed from a photocurable resin, the curing speed of the precursor layer 31 for forming the adhesion layer 13 is higher and the time required for the curing of the precursor layer 31 is shorter than with the case that the adhesion layer 13 is formed from a thermosetting resin. Therefore, the possibility that the precursor layer 31 is deformed by exertion of an external force against the precursor layer prior to curing can be made low. As a consequence, the deformation of the liquid crystal layer 14 in association with the deformation of the precursor layer 31 can be suppressed.

(2) With a configuration having the diffraction layer 15, the deformation of the liquid crystal layer 14 can be suppressed.

(3) Where the adhesion layer 13 is formed from a first photocurable resin and a second photocurable resin, the hardness of the adhesion layer is increased by the portions of the adhesion layer 13 formed by use of the first photocurable resin. Additionally, the portions of the adhesion layer 13 formed by use of the second photocurable resin enable an increase in the adhesion between the adhesion layer 13 and the base material 11 and also in the adhesion between the adhesion layer 13 and the liquid crystal layer 14 to be increased.

(4) Where the adhesion layer 13 is configured to have a first portion 13a and a second portion 13b wherein their crosslink densities differ from each other, the hardness of the adhesion layer 13 is increased by the first portion 13a, and the adhesion between the adhesion layer 13 and the base material 11 and the adhesion between the adhesion layer 13 and the liquid crystal layer 14 are increased by the second portion 13b.

(5) Where an organic compound is any of toluene, methyl isobutyl ketone and isopropyl alcohol, the pitch of the molecules arranged in the liquid crystal layer 14 is suppressed from being changed and the color of light reflected in the liquid crystal layer 14 is suppressed from being changed.

(6) In plan view perpendicular to the first base material 11a, the amount of light irradiated on a portion of the adhesion layer 13 superposed with the metal layer 12 can be made greater than the amount of light irradiated on the other portions. This enables the crosslink density at a portion of the adhesion layer 13 superposed with the metal layer 12 to be increased over the crosslink density at the other portions of the adhesion layer 13. Accordingly, the hardness of the adhesion layer 13 can be increased by the portion of the adhesion layer 13 which is relatively high in crosslink density. The adhesion between the adhesion layer 13 and the base material 11 and the adhesion between the adhesion layer 13 and the liquid crystal layer 14 can be increased by the portion whose crosslink density is relatively low.

It will be noted that the above embodiment may be appropriately altered in the following way.

In the step of irradiating light to the precursor layer 31, if it is possible to permit the crosslinking reaction of a photocurable resin to proceed entirely over the precursor layer 31, light may be irradiated toward the precursor layer 31 from a side opposite to the liquid crystal layer 14 relative to the precursor layer 31. Alternatively, light may be irradiated toward the precursor layer 31 from a direction perpendicular to the precursor layer 31 among the directions intersecting with the thickness direction of the precursor layer 31. Even in this configuration, when the adhesion layer 13 is formed by curing the precursor layer 31 containing a photocurable resin, such effects as set out in the above (1) can be obtained.

The precursor layer for the adhesion layer 13 may be formed on a surface at a side opposite to the contact surface of the liquid crystal layer 14 with the second base material 41. In this configuration, when the precursor layer located on the second base material 41 is contacted with the second base material surface 11b of the base material 11 of the first laminate 30, the precursor layer can be located between the liquid layer 14 and the base material 11.

The organic compound used to disperse or dissolve a photocurable resin may an organic compound other than toluene, methyl isobutyl ketone and isopropyl alcohol. A variety of organic compounds can be used to the extent of not impairing the function of reflecting light having a given wavelength with an organic compound diffused from the adhesion layer 13 into the liquid crystal layer 14 in contact with the adhesion layer 13.

The forming material for the liquid crystal layer 14 is not limited to compounds showing a cholesteric phase, but may be those compounds showing other liquid crystallinity, e.g. compounds showing a nematic phase and a smectic phase.

The crosslink density of the photocured resin may be substantially uniform over the entirety of the adhesion layer 13. If light is irradiated over the entirety of the precursor layer 31 to such an extent that the crosslink density of a photocurable resin serving as the precursor layer 31 is saturated or oversaturated, it is possible that the crosslink density of the photocured resin becomes substantially uniform over the entirety of the adhesion layer 13.

In the liquid crystal laminate 10, the diffraction layer 15 may be omitted. In this configuration, such effects as in (1) above can be obtained so far as the liquid crystal laminate is one which has the metal layer 12 and the liquid crystal layer 14 in face-to-face relation with a part of the base material surface 11a of the base material 11 and wherein the adhesion layer 13 formed by use of a photocurable resin is located between the base material 11 and the liquid crystal layer 14. This configuration is an instance wherein the substrate is constituted of the base material 11 and the base material surface 11a is a first surface and the second base material surface 11b is a second surface.

In the liquid crystal laminate 10, the mask layer 16 may be omitted. The mask layer 16 may be removed from the metal layer 12 after a metal film for forming the metal layer 12 has been subjecting to etching. In this configuration, such effects as obtained in (1) above can be obtained so far as the liquid crystal laminate is one which has the metal layer 12 and the liquid crystal layer 14 facing a part of the first base material surface 11a of the base material 11 and wherein the adhesion layer 13 formed by use of a photocurable resin is located between the base material 11 and the liquid crystal layer 14, like the configuration wherein the diffraction layer 15 is omitted.

In the liquid crystal laminate 10, the protective layer 17 may be omitted. In this case, after the peeling the second base material 41 from the liquid crystal layer 14, the step of forming the protective layer 17 on the surface of the liquid crystal layer 14 at a side opposite to its contact surface with the adhesion layer 13 should be omitted. In this configuration, such effects as in (1) above can be obtained so far as the liquid crystal laminate is one which has the metal layer 12 and the liquid crystal layer 14 facing a part of the base material surface 11a of the base material 11 and wherein the adhesion layer 13 formed using a photocurable resin is located between the base material 11 and the liquid crystal layer 14, like the configuration wherein the diffraction layer 15 is omitted.

Figure 12:
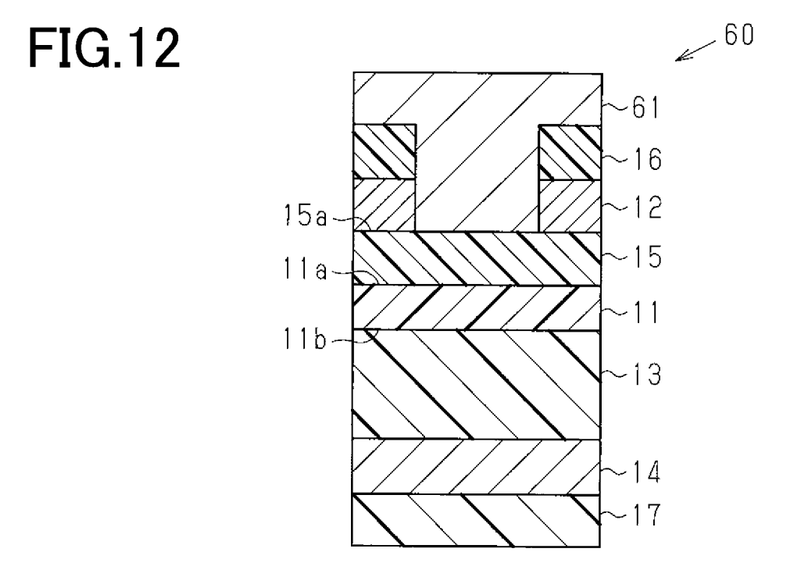
FIG. 12 is a sectional view showing a sectional structure of a liquid crystal laminate according to a modification of the invention.

As shown in FIG. 12, a liquid crystal laminate 60 may be further provided with a background layer 61. The background layer 61 is one which enhances the visibility of the liquid crystal layer 14 as viewed from the direction of the liquid crystal laminate 60 opposite to the protective layer 17. The background layer 61 has optical transparency and may be a colored layer having a color different from the color of light reflected with the liquid crystal layer 14 or may be a light-shielding layer inhibiting the transmission of light directed toward the liquid crystal layer 14 from a side of the base material 11 opposite to the liquid crystal layer 14. The background layer 61 is located at a portion, not covered with the metal layer 12, of the surface of the diffraction layer 15 at a side opposite to the contact surface with the base material 11 and is also located on the surface of the mask layer 16 at a side opposite to the contact surface with the metal layer 12.

Figure 13:
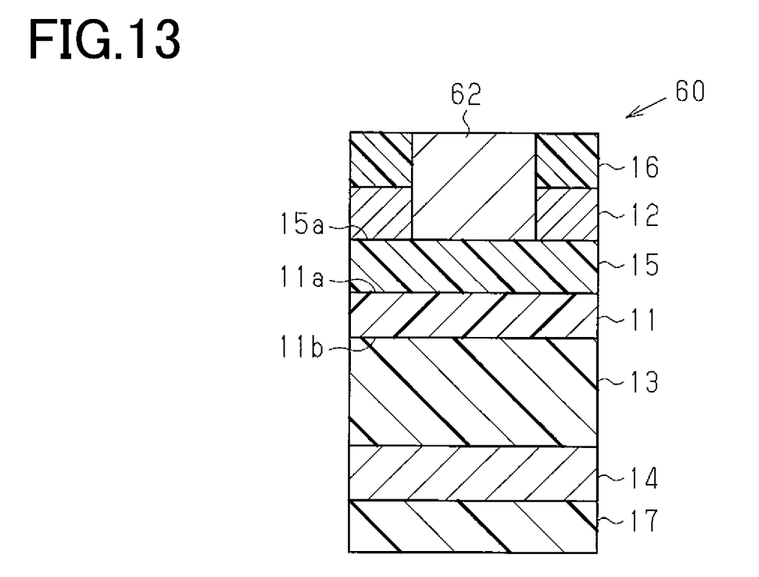
FIG. 13 is a sectional view showing a sectionals structure of a liquid crystal laminate according to another modification of the invention.

Alternatively, as shown in FIG. 13, while a background layer 62 is located at a portion, not covered with the metal layer 12, of the surface of the diffraction layer 15 at a side opposite to the contact surface with the base material 11, it may not be located on the surface of the mask layer 16 at a side opposite to the contact surface with the metal layer 12. In this configuration, such effects as in (1) above can be obtained after the formation of the metal layer 12 and in the state that the liquid crystal laminate has been wound on a winding core prior to the formation of the background layer 61 or 62.

The liquid crystal laminate 10 may have an adhesive layer, which may be located at a portion, not covered with the metal layer 12, of the surface of the diffraction layer 15 at a side opposite to the contact surface with the base material 11 and also of the surface of the mask layer 16 at a side opposite to the contact surface with the metal layer 12.

The liquid crystal laminate 60 previously illustrated with reference to FIG. 12 may have an adhesive layer. In this configuration, the adhesive layer can be located on the surface of the background layer 61 opposite to a stepped surface in contact with the diffraction layer 15 and the mask layer 16. Alternatively, the liquid crystal laminate 60 illustrated above with reference to FIG. 13 may have an adhesive layer. In this configuration, the adhesive layer can be located on the surface of the background layer 62 at a side opposite to the contact surface with the diffraction layer 15 and on the surface of the mask layer 16 at a side opposite to the contact surface with the metal layer 12. In this configuration, such effects as in (1) above can also be contained after the formation of the metal layer 12 and in the state that the liquid crystal laminate has been wound on a winding core prior to the formation of the background layer 61 or 62. With the liquid crystal laminate having no background layer 61 or 62, such effects as in (1) above can be obtained in the state that the liquid crystal laminate has been wound on a winding core prior to the formation of the adhesive layer.

What is claimed is:

1. A liquid crystal laminate comprising:
a substrate including a first surface and a second surface, which is opposite to the first surface, and having optical transparency,
a metal layer on a part of the first surface of the substrate;
an adhesion layer having a first surface and a second surface, which is opposite to the first surface, the first surface of the adhesion layer is in contact with the second surface of the substrate; and
a liquid crystal layer on the second surface of the adhesion layer, wherein the adhesion layer has a first portion and a second portion, a position of the first portion of the adhesive layer on the second surface of the substrate coincides with a position of the metal layer of the first surface, a position of the second portion of the adhesive layer on the second surface of the substrate coincides with a portion of the first surface of the substrate, which does not have the metal layer, the first portion of the adhesion layer comprises a first photocurable resin and the second portion of the adhesion layer comprises a second photocurable resin, wherein when cured, the first photocurable resin has a first crosslink density and the second photocurable resin has a crosslink density lower than the first crosslink density.

2. The liquid crystal laminate of claim 1, wherein the substrate includes a base material and a diffraction layer wherein the diffraction layer is located between the base material and the metal layer and is in contact with the base material and the metal layer and has a diffraction structure at least a part of a surface at a side opposite to a contact surface with the base material.

3. The liquid crystal laminate of claim 1, wherein the liquid crystal layer comprises a cholesteric liquid crystal.

* * * * *